United States Patent Office 3,088,935
Patented May 7, 1963

3,088,935
TETRAFLUOROETHYLENE-SULFUR MONOMERIC AND POLYMERIC COMPOUNDS
Carl G. Krespan, Wilmington, Del., assignor to E. I. du Pont de Nemours and Company, Wilmington, Del., a corporation of Delaware
No Drawing. Filed June 24, 1959, Ser. No. 822,411
11 Claims. (Cl. 260—79)

This invention relates to new addition compounds of tetrafluoroethylene and sulfur, and to methods for their preparation. More particularly, this invention relates to new sulfur-containing, monomeric and polymeric organic fluoro compounds, and to methods of preparing these compounds.

This application is a continuation-in-part of U.S. Patent No. 2,931,803, which is itself a continuation-in-part of my application Serial No. 595,126, filed July 2, 1956, now abandoned.

Tetrafluoroethylene is a well known compound which is used in the chemical industry for various purposes including use as a reactant for preparing many industrially useful monomeric and polymeric products. However, it has not heretofore been possible to effect a direct combination of tetrafluoroethylene with sulfur to obtain compounds containing tetrafluoroethylene units interrupted by sulfur atoms.

It is an object of this invention to provide new fluorocarbon-sulfur compounds and novel processes for their preparation. A further object is to provide new monomeric and polymeric organic fluoro compounds containing a plurality of sulfur atoms. A still further object is to provide a novel process for effecting a direct combination of tetrafluoroethylene with sulfur. Another object is to obtain monomeric and polymeric compounds containing tetrafluoroethylene units interrupted by sulfur atoms. Other objects will appear hereinafter.

These objects are accomplished by providing new fluorocarbon-sulfur compounds characterized by the presence within the molecule of tetrafluoroethylene units,

—CF$_2$—CF$_2$— chemically bound to sulfur atoms. These new compounds are (A) monomeric, polymerizable cyclic fluorocarbon sulfides, as more precisely defined below, and (B) copolymers of tetrafluoroethylene and sulfur, which can be obtained by polymerization of the monomers (A) or by direct combination of tetrafluoroethylene with sulfur.

The monomeric, polymerizable products made available by this invention are monocyclic sulfides of five to seven ring atoms having as the sole ring members from one to two tetrafluoroethylene, —CF$_2$—CF$_2$—, units and from three to four sulfur atoms, of which at least two are contiguous, the —CF$_2$—CF$_2$— units, when more than one is present, being separated by sulfur atoms. These compounds are represented by the formula

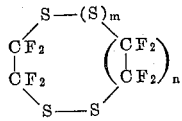

where $m$ and $n$ are cardinal numbers from 0 to 1, with the proviso that when either number is 1, the other is zero, i.e., the sum of $m+n$ is not greater than 1.

The polymeric products of this invention are linear copolymers of tetrafluoroethylene and sulfur. These polymers contain tetrafluoroethylene, —CF$_2$—CF$_2$— units, interrupted by sulfur atoms, and they contain at least 1% by weight of sulfur. Normally, their sulfur content does not exceed about 60% by weight, but it can be as high as 75%.

The monomeric cyclic sulfides can be prepared by a process which comprises bringing tetrafluoroethylene in contact with sulfur vapors at a temperature in the range from about 350 to 450° C. and continuously removing the resulting cyclic sulfides from the reaction zone as they form. They can also be prepared by heating tetrafluoroethylene with sulfur in carbon disulfide solution in a closed vessel at a temperature of at least 250° C. Both methods give also tetrafluoroethylene/sulfur copolymers in variable amounts.

The tetrafluoroethylene/sulfur copolymers can be obtained by the methods just mentioned, or by heating tetrafluoroethylene and sulfur in the presence of catalytic amounts of iodine, e.g., 0.001–0.1 mole of iodine per mole of sulfur, at a temperature in the range of 125–200° C. in closed vessels. Another method of preparing tetrafluoroethylene/sulfur copolymers consists in polymerizing the above-defined monomeric cyclic sulfides, for example by heating or by bringing them in contact with an organic or inorganic base, which can be used in catalytic or massive amounts.

The new monomeric cyclic sulfides corresponding to the general formula shown above are the following three compounds:

Perfluoro-1,2,3-trithiolane (or perfluoro-1,2,3-trithiacyclopentane)

Perfluoro-1,2,3,4-tetrathiane (or perfluoro-1,2,3,4-tetrathiacyclohexane)

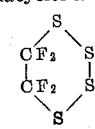

and

Perfluoro-1,2,5-trithiepane (or perfluoro-1,2,5-trithiacycloheptane)

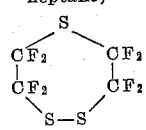

These sulfides, which contain at least three sulfur atoms as ring members, differ fundamentally and unexpectedly from the cyclic mono- and disulfides disclosed and claimed in U.S. Patent No. 2,931,803 (i.e., perfluorothiolane and perfluoro-1,4-dithiane) in that they are readily polymerizable to linear polymers containing —CF$_2$—CF$_2$— units and sulfur atoms, i.e., tetrafluoroethylene/sulfur copolymers, as described in greater detail below. All three monomeric sulfides are distillable liquids. The six- and seven-membered sulfides are thermally quite stable. Perfluoro-1,2,3-trithiolane tends to polymerize on heating, and even on standing at room temperature.

These monomeric sulfides are prepared, broadly speaking, by direct combination of tetrafluoroethylene and sulfur at a temperature of at least 250° C. but not appreciably exceeding the boiling point of sulfur at atmospheric pressure, i.e., not above about 450° C. Two embodiments of this general method are especially well adapted for producing these monomers.

In the first embodiment, a mixture of sulfur and tetrafluoroethylene in the molar ratio sulfur-tetrafluoroethylene at least 1:1, preferably between about 2:1 and 6:1, with carbon disulfide as the reaction medium, is heated in a sealed vessel at a temperature in the range of 250–350° C. The amount of carbon disulfide is not critical, as long as there is enough of it to dissolve at least part of the sulfur (it is also a solvent for tetrafluoroethylene).

In general, there is used an amount of carbon disulfide equal to from one-half to three times the weight of the sulfur. It is desirable to introduce the tetrafluoroethylene gradually in the reaction vessel, to insure the presence of sulfur in a molar ratio at least 1:1 with respect to the tetrafluoroethylene. The inside pressure is at least the autogenous pressure developed by the reactants at the operating temperature or, if desired, excess tetrafluoroethylene pressure can be applied, e.g., up to about 3000 atmospheres. The vessel is preferably agitated and the reaction is desirably, though not essentially, continued until there is no longer any substantial absorption of tetrafluoroethylene. The volatile products are then separated by fractional distillation under reduced pressure. In addition to the monomeric sulfides containing three to four sulfur atoms, this procedure normally gives minor amounts of perfluoro cyclic sulfides containing one or two sulfur atoms, i.e., perfluorothiolane and perfluoro-1,2-dithiane, and variable amounts of linear tetrafluoroethylene/sulfur copolymers. The nature of the products is influenced, at least in part, by the relative proportions of sulfur and tetrafluoroethylene. Increasing the amount of sulfur and/or decreasing the reaction time favors the formation of sulfur-rich cyclic sulfides, i.e., those containing three or four sulfur atoms per tetrafluoroethylene unit.

A second procedure to obtain the monomeric cyclic sulfides consists in bringing tetrafluoroethylene gas in contact with the vapors of boiling sulfur. This operation is carried out at a temperature of at least 350° C. and not exceeding 450° C. In other words, it can be carried out either at atmospheric pressure of about 760 mm., where the boiling point of sulfur is 444–445° C., allowing for minor variations in internal pressure which may raise the temperature of the vapors by a few degrees, or at reduced pressure, provided it is not lower than the pressure (about 190 mm.) where sulfur boils at about 350° C. Atmospheric pressure operation is generally preferred since it is more convenient and also gives better conversions. In practice, the gaseous tetrafluoroethylene is passed through the sulfur vapors at such a rate that the sulfur is present in excess over a 1:1 molar ratio, and the reaction products are continuously removed from the reaction zone and led to appropriate condensers. The condensed products are then purified by distillation. This procedure usually gives also some tetrafluoroethylene/sulfur copolymer, presumably through polymerization of the cyclic monomers.

The linear copolymers can be obtained by direct combination of tetrafluoroethylene and sulfur in carbon disulfide as already mentioned. For this purpose, it is not necessary to use at least one mole of sulfur per mole of tetrafluoroethylene. For example, the mole ratio sulfur/tetrafluoroethylene can be as low as 0.1:1. Another method of preparing these copolymers consists in polymerizing the above-described monomeric cyclic sulfides. For this purpose, each of the individual three sulfides can be used, as well as mixtures of any two or all three of them in any proportions.

The monomeric cyclic sulfides can polymerize spontaneously on thermal treatment, whose length and severity depends on their thermal stability. With perfluoro-1,2,3-trithiolane, for example, mild heating or even storage at room temperature is sufficient to cause at least partial polymerization. The polymerization process is greatly accelerated, and can in fact be made nearly instantaneous even at ordinary or lower temperatures, by bringing the monomeric cyclic sulfides, individually or mixed, in contact with a substance having a basic reaction, i.e., a substance capable of donating electrons. The latter can be used either in massive amounts or in catalytic amounts, e.g., in amounts as low as 0.0001 mole per mole of cyclic sulfide. The electron donor can be an amine (primary, secondary or tertiary) or a quaternary ammonium hydroxide. Examples of such initiators are trimethylamine, triethylamine, tri-n-butylamine, N,N-dimethylaniline, cyclohexylamine, dimethylamine, aniline, pyridine, piperidine, N-methylpiperidine, monoethanolamine, triethanolamine, hexamethylenetetramine, ethylenediamine, tetraethylammonium hydroxide, benzyltriethylammonium hydroxide, and the like. Tertiary amines are generally preferred. Inorganic bases in aqueous or alcoholic solutions can also be used, e.g., ammonium hydroxide, dilute solutions of alkali or alkaline earth metal hydroxides or sulfides, etc. Other substances which are electron donors but have very low basic strength can be used with excellent results. These includes water, lower alkanols such as methanol or ethanol, acetone, acetonitrile, dimethyl formamide, dimethyl sulfoxide, and organic triesters of phosphoric and phosphorus acids such as triethyl phosphate, trimethyl phosphite and triphenyl phosphite.

The linear tetrafluoroethylene/sulfur copolymers, regardless of the method of preparation used, are non-volatile materials having molecular weights above 1000, generally above 5000. Depending upon the molecular weight and the sulfur content, they have the physical appearance of viscous oils, or of relatively low-softening waxes, or of solids of higher softening point, in the range of 55 to 100° C. or even higher. They differ from unmodified polytetrafluoroethylene in being considerably lower softening and in having higher solubility in organic solvents. The amount of sulfur present in these copolymers is at least 1% by weight. It can be quite high. For example, the polymers prepared by polymerization of the monomeric cyclic sulfides can contain up to about 56% of sulfur, and polymers prepared by direct combination of tetrafluoroethylene and sulfur can contain even more sulfur. In general, however, the sulfur content is between about 3% and about 55% by weight, and the polymers of greater general utility are those containing from about 20% to about 55% of sulfur. The copolymers contain tetrafluoroethylene units, $-CF_2-CF_2-$, chemically bound to sulfur atoms. The internal structure of the polymer chain depends, in part at least, on the amount of sulfur present. Sulfur-poor polymers have a number of $-CF_2-CF_2-$ units linked together and separated at intervals by sulfur atoms, while sulfur-rich polymers have polysulfide linkages separating the $$-CF_2-CF_2-$$

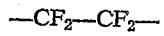

units. Polymers prepared by the method in which iodine is used as the reaction catalyst contain small amounts of chemically bound iodine, which is presumably present as end groups. The presence of iodine is shown by heat decomposition of the polymer, which is attended by liberation of small quantities of free iodine.

The invention is illustrated in greater detail by the following examples.

*Example I*

A mixture of 16.0 g. (0.5 mole) of sulfur and 15 ml. of carbon disulfide was heated to 300° C. in an agitated pressure tube, and 50 g. (0.5 mole) of tetrafluoroethylene was injected in portions over a period of 5 hours, after which the mixture was heated at 300° C. for another 2 hours. Distillation of the reaction product gave first 8.8 g. of a mixture of carbon disulfide with small amounts of perfluorothiolane,

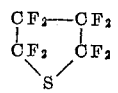

and perfluoro-1,4-dithiane,

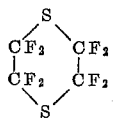

then 10.5 g. of pure perfluoro-1,4-dithiane, B.P. 79–81° C., and finally 5.2 g. of a product boiling at 71° C. at 100 mm., which was shown by elemental analysis to be perfluoro-1,2,5-trithiepane,

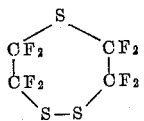

*Analysis.*—Calcd. for $C_4F_8S_3$: C, 16.22; F, 51.31; S, 32.47. Found: C, 16.59; F, 52.13; S, 32.38.

The nuclear magnetic resonance spectrum supported the assigned structure, as did the infrared spectrum which showed that no unsaturation was present.

*Example II*

Monomeric cyclic sulfides richer in sulfur than perfluoro-1,2,5-trithiepane were obtained by increasing the ratio of sulfur to tetrafluoroethylene in the procedure of Example I.

A mixture of 64.0 g. (2 moles) of sulfur and 75 ml. of carbon disulfide was heated to 300° C. in an agitated pressure tube, and 100 g. (1 mole) of tetrafluoroethylene was injected continuously over a period of 2.5 hours. After another hour at 300° C., the tube was cooled and a small amount of gas was bled off. Distillation of the crude liquid product gave three fractions: (1) 84 g. of a colorless liquid, B.P. 30–46° C.; (2) 14.5 g. of a yellow oil, B.P. 56–57° C. at 50 mm.; and (3) 54.4 g. of a yellow oil, B.P. 60–90° C. at 30 mm. There was also obtained (4) 25 g. of a waxy distillation residue and (5) 3.8 g. of a pale yellow solid which formed during distillation as a coating on the stillhead condenser.

Fraction (1) was cooled to —80° C. and filtered at that temperature. The liquid phase was mainly carbon disulfide. The phase solid at —80° C., which was liquid at 25° C., was stirred with 10% sodium hydroxide and the liquid lower layer was separated, dried and distilled to give 27.0 g. of perfluoro-1,4-dithiane, B.P. 79–81° C.

Fraction (2) gave on redistillation 8.2 g. of perfluoro-1,2,5-trithiepane, B.P. 71–72° C. at 100 mm., and further identified by nuclear magnetic resonance analysis. On contact with a small amount of triethylamine, this product (which is identical with that of Example I) polymerized readily to a waxy linear copolymer of tetrafluoroethylene and sulfur.

Fraction (3) was redistilled to give 10 g. of a viscous first fraction, which was shown by nuclear magnetic resonance analysis to be partly polymerized perfluoro-1,2,3,-trithiolane,

21.8 g. of a yellow oil B.P. 65–100° C. at 90 mm., which was shown by its nuclear magnetic resonance spectrum to be essentially perfluoro-1,2,3,4-tetrathiane,

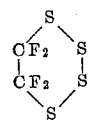

and 20 g. of a viscous, light-colored residue consisting chiefly of low molecular weight tetrafluoroethylene/sulfur copolymers. The total distillate from fraction (3), which thickened through polymerization when heated to 150° C., had a composition corresponding to the formula $C_2F_4S_{3.5}$, i.e., to a mixture of perfluoro-1,2,3-trithiolane and perfluoro-1,2,3,4-tetrathiane.

*Analysis.*—Calcd. for for $C_2F_4S_{3.5}$: C, 11.32; F, 35.81; S, 52.87. Found: C, 11.72; F, 36.37; S, 52.37.

A portion of this distillate was redistilled. This second distillate, B.P. 30–40° C. at 10 mm., polymerized at once on treatment with a few drops of triethylamine. There was thus obtained a tetrafluoroethylene/sulfur copolymer containing 36.25% fluorine and 52.55% sulfur. This polymer was dissolved in chloroform and reprecipitated by addition of methanol. The polymer after this treatment had substantially the same composition as before.

Fraction (4) was also a tetrafluoroethylene/sulfur copolymer, as was fraction (5), the latter having formed during distillation of the liquid reaction product. This product had a composition corresponding approximately to the formula $(C_2F_4S_{2.5})_x$.

*Analysis.*—Calcd. for $(C_2F_4S_{2.5})_x$: F, 42.2; S, 44.5. Found: F, 40.86; S, 45.78.

After dissolving in chloroform and reprecipitating by addition of methanol, the polymer of fraction (5) had substantially the same composition as before.

*Example III*

Using the procedure of Example II but with a larger excess of sulfur and a shorter reaction period gave higher proportions of sulfur-rich cyclic sulfides. Into a mixture of 128 g. (4 moles) of sulfur and 75 ml. of carbon disulfide in an agitated bomb heated at 300° C. was injected 102 g. (1 mole) of tetrafluoroethylene over a 20-minute period. The reaction mixture was then heated at 300° C. for an additional 20 minutes. Distillation of the viscous reaction product gave 6.8 g. of perfluoro-1,4-dithiane, B.P. 80–81° C., and small amounts of perfluoro-1,2,5-trithiepane. The major volatile product was 50.5 g. of a yellow oil, B.P. 70–85° C. at 30 mm., whose composition corresponded approximately to the formula $C_2F_4S_4$, and which therefore consisted chiefly of perfluoro-1,2,3,4-tetrathiane.

*Analysis.*—Calcd. for $C_2F_4S_4$: F, 33.30; S, 56.18. Found: F, 34.93; S, 55.48.

There was also obtained as the distillation residue a waxy copolymer of tetrafluoroethylene and sulfur.

*Example IV*

A tetrafluoroethylene/sulfur copolymer was prepared by reaction of sulfur with excess tetrafluoroethylene. Into a mixture of 6.4 g. (0.20 mole) of sulfur in 75 ml. of carbon disulfide heated to 250° C. in a pressure tube was injected continuously 100 g. (1 mole) of tetrafluorothylene over a period of 80 minutes. After removal of the volatile reaction products, there was obtained 5.7 g. of a tetrafluoroethylene/sulfur copolymer containing 12.4% by weight of sulfur. This polymer did not decompose when heated to 250° C.

*Example V*

A mixture of 16 g. (0.5 mole) of sulfur, 50 g. (0.5 mole) of tetrafluoroethylene and 1.27 g. (0.005 mole) of iodine was heated at 150° C. for 17 hours under autogenous pressure. There was obtained 40 g. of a soft, white, solid reaction product which was soluble in benzene and chloroform. Continuous extraction of this product with acetone, then with carbon disulfide, removed all unreacted sulfur and readily soluble polymer, leaving 9.2 g. of a waxy, insoluble polymer which was shown by analysis to contain 74.97% fluorine and 3.93% sulfur. This product showed an X-ray diffraction pattern similar to that of unmodified polyeterafluoroethylene. It contained some chemically bound iodine, as shown by the fact that, on pyrolysis, small amounts of free iodine were evolved.

A similar polymer product was obtained by heating 16 g. (0.5 mole) of sulfur, 0.13 g. (0.0005 mole) of iodine and 25 g. (0.25 mole) of tetrafluoroethylene to 150° C. under autogenous pressure, then injecting 25 g. additional tetrafluoroethylene in portions over a 4-hour period and continuing the heating for 10 hours more at 150° C.

*Example VI*

A mixture of 8 g. (0.25 mole) of sulfur, 1.27 g. (0.005 mole of iodine and 50.5 g. (0.51 mole) of tetrafluorothylene was heated at 150° C. for 5 hours under autogenous pressure, then at 250° C. for 4 hours. There was obtained 25 g. of a white and purple solid. The purple color (iodine) was removed, as well as the volatile materials, by heating the solid at 100° C. under 1 mm. pressure. The residue (21.5 g.) was further heated at 100° C. under 1 mm. pressure and a yellow sublimate of elemental sulfur (0.9 g.) was collected on a cold finger. After 25 hours, no more sulfur was subliming. The residue, 20.6 g., melted at 70–150° C. and did not decompose when heated to 200° C. This polymer product contained 18.97% carbon, 59.02% fluorine, and 24.63% sulfur. It was partly soluble in carbon disulfide and the insoluble polymer residue (7.5 g.) contained 19.07% carbon, 55.21% fluorine, and 18.02% sulfur.

*Example VII*

This example illustrates the reaction of tetrafluorothylene with the vapors of boiling sulfur at atmospheric pressure.

The apparatus was a round-bottom glass reactor fitted at the top with two long upright necks, one of which served as the inlet for the tetrafluoroethylene and, optionally, a carrier gas, and the other served as the outlet for the reaction product. Both necks served also as air-cooled reflux condensers for the sulfur vapors.

Two hundred grams of sulfur was placed in the reactor, which was swept with nitrogen and heated until the sulfur refluxed well up inside the necks, the sulfur vapor in the reactor being therefore at 444–445° C., the boiling point of sulfur at 760 mm. pressure. Gaseous tetrafluoroethylene (38 g.) was passed through the sulfur vapors over a period of 1.5 hours. The reaction product was removed as it formed through the outlet tube, passed through an air-cooled downward condenser and collected in a receiver as a mixture of oil and solid. At the exit end of the system, a trap cooled to −80° C. condensed the material volatile at 25° C. This volatile fraction contained about 10 g. of product boiling below 25° C., which was found to be a mixture of thiocarbonyl fluoride, $CF_2S$, and trifluorothioacetyl fluoride, $CF_3CSF$. It also contained 3.2 g. of a liquid composed mainly of carbon disulfide and bis(trifluoromethyl)disulfide.

The main reaction product, condensed in the first receiver, consisted of 65.1 g. of a mixture of oil and solid. Redistillation of this product gave 45.7 g. of a distillate boiling at 40–85° C. at 25 mm. This distillate was a mixture of perfluoro-1,2,3-trithiolane and perfluoro-1,2,3,4-tetrathiane. When added dropwise to stirred methanol, it coagulated quickly to a solid polymer. This polymer was dissolved in toluene, precipitated with methanol, redissolved in chloroform, again precipitated with methanol, washed with methanol and dried.

*Analysis.*—Calcd. for $(C_2F_4S_{3.5})_x$: S, 52.87. Found: S, 51.75.

The solid product obtained directly during the preparation was also a tetrafluoroethylene/sulfur copolymer, of approximately the same composition, which had formed presumably owing to partial polymerization of the cyclic sulfides, catalyzed by the alkalinity of the glass apparatus.

*Example VIII*

The procedure of Example VII was repeated on a larger scale with better identification of the reaction products. The apparatus was a 1-liter glass reactor provided with an inlet tube delivering the tetrafluoroethylene into the sulfur vapors, i.e., above the molten sulfur, and an upright outlet neck 35 cm. in length and 25 mm. inside diameter, serving also as condenser for the sulfur vapors. Nine hundred grams of sulfur was placed in the reactor, which was heated to the refluxing point of sulfur, about 445° C. at atmospheric pressure, and 300 g. of tetrafluoroethylene was passed through the sulfur vapors over a period of 3 hours. Heating was regulated so that the temperature of the escaping reaction product at the head of the outlet tube was 300–310° C. The products were collected as in Example VII, and there was 360 g. of residual sulfur left in the reactor.

The volatile fraction, condensed in a trap cooled at −80° C., consisted of 24 ml. of product boiling below 25° C. and 40 g. of less volatile but low-boiling liquid. The main product consisted of 579 g. of distillate condensed at 25° C., which was a liquid containing some solid material. Redistillation of this condensate gave 540 g. of a mobile oil, B.P. 50–70° C. at 10 mm. which was collected in acid-washed glass receivers.

The crude distillates obtained from several similar preparations weer combined and fractionated in acid-washed equipment to separate the components. Two fractions were obtained, the smaller one (A) boiling at or below 25° C. at 10 mm., the larger one (B) boiling at 52–53° C. at 10 mm. This larger fraction was essentially pure perfluoro-1,2,3,4-tetrathiane, identified by its nuclear magnetic resonance spectrum. The smaller fraction (A) gave on redistillation a mobile oil, B.P. 38–39° C. at 30 mm., which thickened on standing. This was essentially pure perfluoro-1,2,3-trithiolane, identified by elemental analysis.

*Analysis.*—Calcd. for $C_2F_4S_3$: C, 12.24; F, 38.74; S, 49.02. Found: C, 12.36; F, 40.02; S, 48.25.

The structure was confirmed by infrared and nuclear magnetic resonance analysis.

During the distillation of perfluoro-1,2,3-trithiolane, the monomer partially polymerized to give a solid tetrafluoroethylene/sulfur copolymer of the same composition as the monomer. This copolymer was washed with acetone, dissolved in toluene, reprecipitated from this solution by addition of petroleum ether and dried.

*Analysis.*—Calcd. for $(C_2F_4S_3)_x$: F, 38.74; S, 49.02. Found: F, 39.86; S, 48.40.

*Example IX*

From another preparation carried out essentially as described in Example VIII was obtained a reaction product which, on preliminary distillation at 1–15 mm. pressure, gave 812.5 g. of a mobile yellow liquid. Fractionation of this material at 15 mm. pressure yielded the following fractions:

|     |         | G.   |
| --- | ------- | ---- |
| (1) | 26–32° C | 97   |
| (2) | 32–59° C | 26   |
| (3) | 59–61° C | 270  |
| (4) | 61° C    | 86.5 |
| (5) | 61–62° C | 123  |

Fraction 1 was essentially pure perfluoro-1,2,3-trithiolane. Redistillation of fractions 3, 4 and 5 combined yielded pure perfluoro-1,2,3,4-tetrathiane as a nearly colorless liquid, B.P. 58° C. at 15 mm., $n_D^{26}$ 1.5448, which solidified on cooling to a solid melting at 13° C.

*Analysis.*—Calcd. for $C_2F_4S_4$: C, 10.52; F, 33.31; S, 56.18. Found: C, 10.60; F, 34.70; S, 56.14.

The infrared, ultraviolet and nuclear magnetic resonance spectra supported the structure assigned to this compound.

*Example X*

The reaction of tetrafluoroethylene with sulfur vapor under reduced pressure was carried out as follows: Using the apparatus of Example VIII, connected to a vacuum pump through a system of traps cooled in liquid nitrogen, 900 g. of sulfur was refluxed in an atmosphere of nitrogen at 360° C. and 200 mm. pressure. A slow stream of 76 g. of tetrafluoroethylene was passed through the sulfur vapors over a period of 4 hours. Heating was regulated during the reaction so that the temperature at the head of the take-off tube was 70–80° C. The system was flushed with nitrogen at the end of the operation.

A substantial amount of unreacted tetrafluoroethylene was collected in the liquid nitrogen-cooled trap. In the first receiver was a condensate of 7.2 g. of liquid containing some solid tetrafluoroethylene/sulfur copolymer. The liquid was a mixture of perfluoro-1,2,3-trithiolane and perfluoro-1,2,3,4-tetrathiane. This mixture polymerized rapidly to a tetrafluoroethylene/sulfur copolymer when poured into acetone.

Example XI

Perfluoro-1,2,3,4-tetrathiane was polymerized by pouring 50 g. of the monomer into 140 g. of vigorously stirred acetone at room temperature over a period of two minutes. The resulting white gummy solid was washed with pentane, dissolved in toluene and reprecipitated by addition of pentane, to yield 40 parts of a white, fluffy, solid copolymer of tetrafluoroethylene and sulfur.

*Analysis.*—Calcd. for $(C_2F_4S_4)_x$: C, 10.52; F, 33.31; S, 56.18. Found: C, 10.70; F, 34.07; S, 55.97.

The crystalline melting point of this polymer was 55–60° C., and its inherent viscosity in 0.1% toluene solution at 25° C. was 0.68. It could be pressed at 90–100° C. into tough, cold-drawable films.

Example XII

Low temperature polymerization of perfluoro-1,2,3,4-tetrathiane was effected by cooling a solution of 0.1 g. of triethyl phosphite in 35 g. of pentane to —80° C., adding 8.5 g. of the monomer and allowing the mixture to stand for one hour at —80° C. The solvent was then decanted, the polymer was dissolved in toluene, reprecipitated with pentane, washed with pentane and dried. There was obtained 2.5 g. of copolymer having an inherent viscosity of 0.67 in 0.1% solution in toluene at 25° C.

The monomer was similarly polymerized at —80° C. in ether of toluene solution containing a very small amount of triethyl phosphite, or in acetone without additional initiator. These polymers had the following inherent viscosities in 0.1% toluene solution at 25° C.:

From ether and triethyl phosphite _____ 0.28
From toluene and triethyl phosphite _____ 0.75
From acetone (no added initiator) _____ 1.78

Other initiators which induced rapid polymerization of perfluoro-1,2,3,4-tetrathiane dissolved in ether at room temperature when added in trace amounts to this solution were water, acetonitrile, dimethyl formamide, acetone, dimethyl sulfoxide, pyridine, triethyl phosphate, trimethyl phosphite, triphenyl phosphite and triethylamine.

Example XIII

A solution of 164 g. of perfluoro-1,2,3-trithiolane (prepared as described in Example VIII) in 210 parts of pentane was cooled to —80° C. To this solution was added a solution of 0.1 g. of trimethyl phosphite in 0.7 g. of pentane and the mixture was allowed to stand for one hour at —80° C. The solvent was decanted and the solid tetrafluoroethylene/sulfur copolymer which had formed was dissolved in toluene and reprecipitated with pentane. A second similar treatment followed by washing with pentane yielded 30 g. of polymer having an inherent viscosity of 1.21 in 0.1% solution in toluene at 25° C. The polymer was pressed to a crystalline film melting at 95–100° C. which became oriented by drawing at 100° C.

The products of this invention are useful in a variety of applications. For example, the monomeric perfluoro cyclic sulfides are useful as inhibitors of free radical-initiated polymerization of polymerizable unsaturates, as shown by the following tests, carried out with freshly distilled, uninhibited vinyl acetate. In each test, a 3 ml. sample of the monomer was used. Test 1 was the control, i.e., nothing was added to the vinyl acetate. In tests 2–5, 0.02 g. of α,α'-azobis-(α,α-dimethylvaleronitrile) was added as the polymerization initiator. In tests 2, 3 and 4, 0.2 g. of perfluoro-1,2,3-trithiolane, perfluoro-1,2,3,4-tetrathiane and perfluoro-1,2,5-trithiepane, respectively, was added as the polymerization inhibitor. In test 5, no inhibitor was added. All five samples were heated at 70° C. for 15 minutes, after which 1 ml. aliquots were taken from each sample that was still liquid and the time required for these aliquots to drain from the same pipette was determined, thus measuring the change in viscosity from the control. The results are recorded in the following table:

| Test No. | Composition | Flow Time (Seconds) |
|---|---|---|
| 1 | Vinyl acetate alone | 4. |
| 2 | Vinyl acetate+initiator+perfluoro-1, 2, 3-trithiolane. | 5. |
| 3 | Vinyl acetate+initiator+perfluoro-1, 2, 3, 4-tetrathiane. | 4. |
| 4 | Vinyl acetate+initiator+perfluoro-1, 2, 5-trithiepane. | Slow drainage. |
| 5 | Vinyl acetate+initiator | Set to glass. |

It will be seen from the above table that perfluoro-1,2,3-trithiolane and perfluoro-1,2,3,4-tetrathiane are excellent inhibitors of the catalyzed polymerization of vinyl acetate. Perfluoro-1,2,5-trithiepane is less effective but still shows a very significant inhibitory action. The polymerization of other unsaturated monomers such as styrene or methyl methacrylate is similarly inhibited.

The monomeric perfluorocyclic sulfides are furthermore useful as such in the coating or impregnating of fibrous or porous substrates such as paper, fabrics, wood, bricks, wire screens, etc. The already described ability of these monomers to polymerize rapidly under the influence of very mild agents permits the ready formation of polymers homogeneously dispersed within, or at the surface of, these substrates for the purpose of creating valuable effects such as water repellency, adhesive properties, etc.

The tetrafluoroethylene/sulfur copolymers have many valuable uses. Those which are rich in fluorine, i.e., in which the sulfur content is less than about 25% by weight, are useful as flame-resistant components of waxes and as softeners and plasticizers for high-melting polymers such as polytetrafluoroethylene. The copolymers, especially those of relatively low molecular weight, which have an oily or soft consistency, are active soil fungicides and nematocides. As a class, the tetrafluoroethylene/sulfur copolymers are highly useful as water-repellent and protective coating and impregnating agents, as illustrated by the following tests.

A polymer was prepared from a mixture of polymerizable cyclic sulfides prepared by the procedure of Example II, this mixture comprising as the major constituent perfluoro-1,2,3,4-tetrathiane, with lesser amounts of perfluoro-1,2,3-trithiane and perfluoro-1,2,5-trithiepane. Ten grams of this mixture was added to 40 ml. of stirred methanol. The solid which separated rapidly was washed by kneading with methanol, dissolved in toluene and reprecipitated by addition of methanol. There was thus obtained a tetrafluoroethylene/sulfur copolymer containing 50.48% of sulfur. The polymer became sticky around 70° C. It was stable at 100° C. and only began to darken after 30 minutes' heating at 200° C. It was stable to dilute aqueous acids, somewhat more sensitive to aqueous alkali.

Paper impregnated with a 10% toluene solution of this copolymer showed excellent water repellency, superior to that obtained with a composition of mixed carnauba and paraffin waxes. Coatings applied to steel, aluminum and copper from a 10% toluene solution of the copolymer had strong adhesion to the metals, either after being baked for one hour at 140° C. or without baking. Rust formation on steel so coated after 3 days' immersion in water was substantially decreased. Panels of cedar and mahogany brushed with a toluene solution of tetrafluoroethylene/sulfur copolymer were made water-repellent, as shown by the fact that they gained less weight upon being immersed in water than uncoated panels. The tetrafluoroethylene/sulfur copolymer was compatible with crepe rubber and wax compositions.

Such mixtures, containing approximately 10% by weight of the copolymer, formed protective coatings on surfaces such as glass or floor tiles with no less in durability or other physical properties.

As has been shown, the tetrafluoroethylene/sulfur copolymers can be formed into self-supporting films capable of being oriented by drawing. Fibers of tetrafluoroethylene/sulfur copolymers can be formed by simultaneous extrusion and polymerization of the monomeric perfluoro cyclic sulfides, individually or as mixtures, into a 50/50 acetone-water solution containing a few drops of triethylamine.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Compounds having the formula

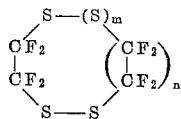

wherein $m$ and $n$ are cardinal numbers from 0 to 1, with the proviso that when either number is 1, the other is zero.

2. Perfluoro-1,2,3-trithiolane.
3. Perfluoro-1,2,3,4-tetrathiane.
4. Perfluoro-1,2,5-trithiepane.
5. Process of preparing fluorocarbon sulfur compounds containing at least three sulfur atoms and having tetrafluoroethylene units chemically bound to sulfur, which comprises bringing tetrafluoroethylene in contact with the vapors of boiling sulfur at a temperature of at least 350° C. but not in excess of 450° C. and continuously removing the resulting products from the reaction zone as they form.
6. Process of claim 5 conducted at atmospheric pressures and wherein the tetrafluoroethylene is passed through the sulfur vapors at such a rate that the molar ratio of sulfur to tetrafluoroethylene is in excess of 1:1.
7. Process of preparing perfluoro-1,2,3-trithiolane, perfluoro-1,2,3,4-tetrathiane, perfluoro-1,2,5-trithiepane and linear copolymers of sulfur and tetrafluoroethylene containing at least 1% sulfur by weight, which comprises heating a reaction mixture consisting essentially of tetrafluoroethylene, sulfur and carbon disulfide in a sealed vessel at a temperature in the range of 250–350° C., the molar ratio of sulfur to tetrafluoroethylene in the reaction mixture being at least 1:1, and the amount of carbon disufide present in the reaction mixture being sufficient to dissolve at least part of the sulfur.
8. Process for polymerizing the monomeric cyclic sulfides of the formula

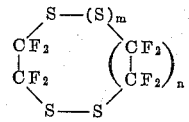

wherein $m$ and $n$ are cardinal numbers from 0 to 1, the sume of $m+n$ being no greater than one, which comprises effecting contact between the sulfide and a base.
9. Linear polymers having units of sulfur and tetrafluoroethylene, wherein said polymer contains at least 1% of sulfur by weight, is non-volatile and is of molecular weight greater than 1000.
10. A linear polymer of claim 9 consisting essentially of tetrafluoroethylene units and from about 20% to about 55% sulfur by weight.
11. Polymers of cyclic sulfides of the formula

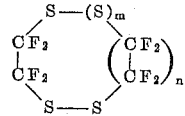

wherein $m$ and $n$ are cardinal numbers from 0 to 1, the sum of $m$ and $n$ being no greater than 1.

References Cited in the file of this patent

UNITED STATES PATENTS

| | | |
|---|---|---|
| 2,258,860 | Pier et al. | Oct. 14, 1941 |
| 2,451,411 | Raasch | Oct. 12, 1948 |
| 2,657,198 | David | Oct. 27, 1953 |
| 2,728,750 | Tobolsky et al. | Dec. 27, 1955 |
| 2,931,803 | Krespan | Apr. 5, 1960 |
| 2,952,706 | Lipscomb | Sept. 13, 1960 |